US011300536B1

(12) United States Patent
Kolych et al.

(10) Patent No.: US 11,300,536 B1
(45) Date of Patent: Apr. 12, 2022

(54) NON-CONTACT LIQUID SENSING TECHNOLOGIES

(71) Applicant: Cypress Semiconductor Corporation, San Jose, CA (US)

(72) Inventors: Igor Kolych, Lviv (UA); Igor Kravets, Lviv (UA); Oleksandr Karpin, Lviv (UA); Andriy Maharyta, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 17/126,573

(22) Filed: Dec. 18, 2020

(51) Int. Cl.
*G01N 27/22* (2006.01)
(52) U.S. Cl.
CPC .................... *G01N 27/226* (2013.01)
(58) Field of Classification Search
CPC ........... G01N 27/226; G01N 2001/024; G01N 2223/637
See application file for complete search history.

(56) References Cited

U.S. PATENT DOCUMENTS

| | | | |
|---|---|---|---|
| 7,509,856 | B1 | 3/2009 | Winkens et al. |
| 9,684,418 | B1 | 6/2017 | Hills et al. |
| 10,437,384 | B2 | 10/2019 | Oral et al. |
| 10,712,867 | B2 | 7/2020 | Li et al. |
| 10,744,712 | B2 | 8/2020 | Megretski et al. |
| 2006/0250140 | A1* | 11/2006 | Manneschi .......... G01N 27/025 324/600 |
| 2008/0252302 | A1* | 10/2008 | Manneschi .......... G01N 27/025 324/608 |
| 2009/0146061 | A1* | 6/2009 | Manneschi .......... G01N 27/023 250/339.12 |
| 2011/0146399 | A1 | 6/2011 | Burdi et al. |
| 2015/0185143 | A1* | 7/2015 | Manneschi ............ G01N 33/18 250/339.12 |
| 2018/0335870 | A1 | 11/2018 | Ali et al. |

FOREIGN PATENT DOCUMENTS

| | | |
|---|---|---|
| CN | 104535135 A | 4/2015 |
| CN | 204346543 U | 5/2015 |
| CN | 107228699 B | 11/2019 |
| CN | 110568502 A | 12/2019 |
| CN | 210603488 U | 5/2020 |

OTHER PUBLICATIONS

Liquid Tolerant Capacitive Touch Keypad Design; TI Designs: TIDM-1021; 28 pages.

* cited by examiner

*Primary Examiner* — Alvaro E Fortich

(57) ABSTRACT

Technology directed to non-contact liquid sensing is described. One processing device includes a multi-port network, a capacitance measurement circuit, and a digital processing circuit. Processing device measures a first set and a second set of currents associated with a first electrode and a second electrode coupled to an exterior surface of a container holding liquid. Processing device determines independent impedances of the container, the liquid, and the liquid and container using the first set of currents and the second set of currents. Processing device determines an electrical property of the liquid using the independent impedances of the liquid.

21 Claims, 9 Drawing Sheets

US 11,300,536 B1

NON-CONTACT LIQUID SENSING TECHNOLOGIES

BACKGROUND

There is a big growing market for combined liquid level and property sensing in automotive, Internet of Things (IoT), and consumer spaces. For example, some applications for liquid level and liquid property sensing can include windshield-washing fluid, fuel level sensor, water hardness level for coffee machines, smart sensing in refrigerators, or the like. Most of these applications require non-contact sensing.

BRIEF DESCRIPTION OF THE DRAWINGS

The disclosure is illustrated by way of example, and not of limitation, in the figures of the accompanying drawings.

DETAILED DESCRIPTION

Figure 1:
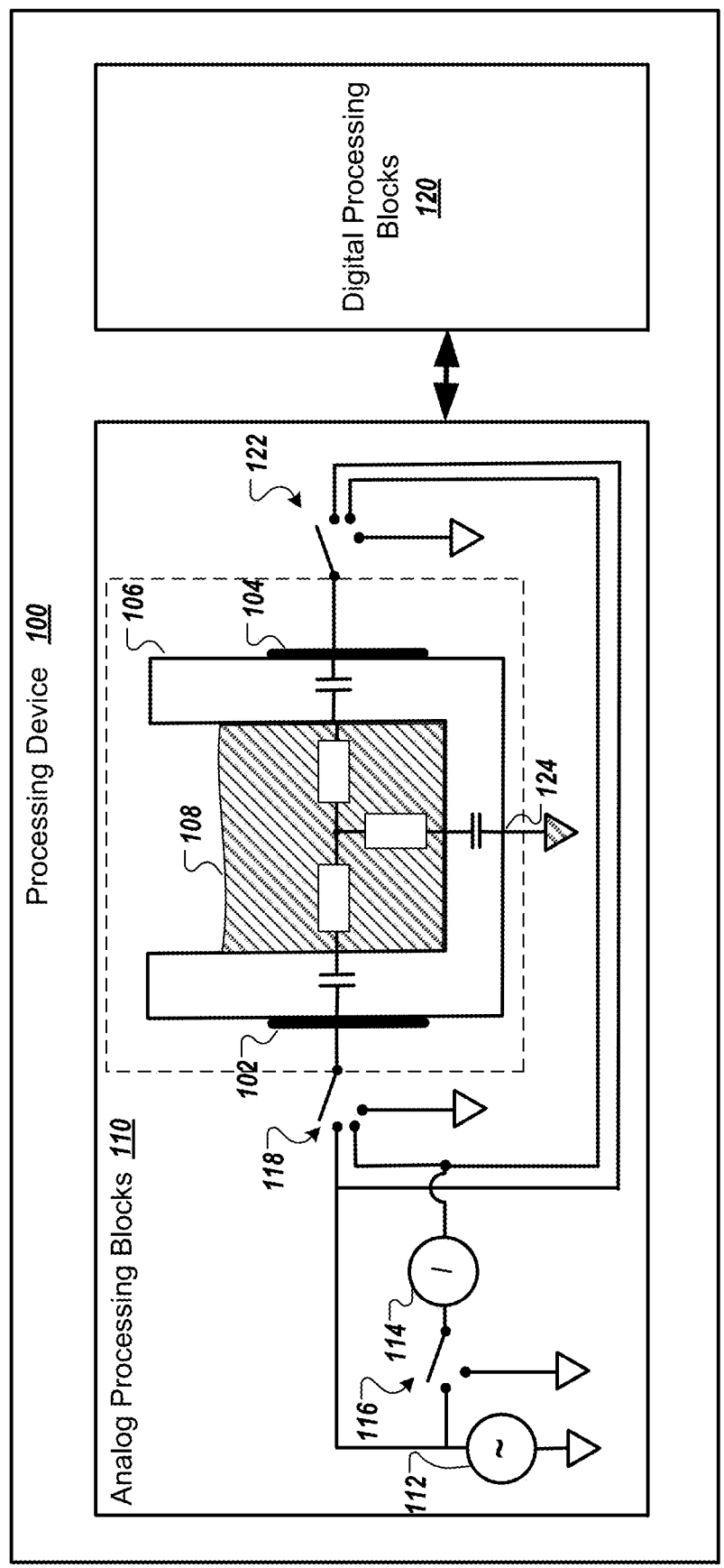
FIG. 1 is a block diagram of a processing device for non-contact liquid sensing and determining an electric property of liquid in a container according to at least one embodiment.

The following description sets forth numerous specific details such as examples of specific systems, components, methods, and so forth, in order to provide a good understanding of various embodiments of the techniques described herein for non-contact liquid sensing technologies. As described above, there are various applications that require non-contact liquid sensing, such as applications in the automotive, IoT, and consumer spaces.

Conventionally, an oscilloscopic method and a bridge method are used to find an amplitude and a phase shift with high oversampling and in-phase and quadrature (IQ) demodulation. These methods place liquid in predefined conditions (e.g., special fixtures) to minimize environmental impacts. Conventional methods cannot measure liquid properties in arbitrary or dynamic environments. These methods do not account for grounding impacts, causing a baseline drift. In addition, these methods cannot deal with film and foam of liquid on the walls, giving false level readings. In addition, there are manufacturing tolerances and temperature dependencies on the walls' (or coating) electric proprieties that can cause issues in these methods. For example, there can be sensitivity to the plastic wall thickness of a container that can vary capacitance measurements, as these conventional methods cannot measure the electrical properties of the liquid itself or the absolute value of liquid conductivity and permittivity.

Described herein are various embodiments of techniques for non-contact liquid sensing technologies. A multi-port network can be used to implement a non-contact liquid sensing method that combines self-capacitance and mutual-capacitance sensing at multiple frequency ranges and allows measurements of absolute values of liquid electrical properties. The non-contact liquid sensing method can remove the influence or impact of dielectric coating (container walls) and grounding impact caused by changing environment. The non-contact liquid sensing method can also distinguish liquid volume from foam and film on the wall of the container, as described in more detail below.

One processing device includes a multi-port network, a current measurement circuit, and a digital processing circuit. Processing device measures a first set and a second set of currents associated with a first electrode, a second electrode, coupled to an exterior surface of a container holding liquid. There is ambient ground caused by conductive objects around a container with liquid. A processing device determines independent impedances of the container, the liquid, and the liquid and container using the first set of currents and the second set of currents. A processing device determines an electrical property of the liquid using the independent impedances of the liquid.

Reference in the description to "an embodiment," "one embodiment," "an example embodiment," "some embodiments," and "various embodiments" means that a particular feature, structure, step, operation, or characteristic described in connection with the embodiment(s) is included in at least one embodiment of the present disclosure. Further, the appearances of the phrases "an embodiment," "one embodiment," "an example embodiment," "some embodiments," and "various embodiments" in various places in the description do not necessarily all refer to the same embodiment(s).

The description includes references to the accompanying drawings, which form a part of the detailed description. The drawings show illustrations in accordance with exemplary embodiments. These embodiments, which may also be referred to herein as "examples," are described in enough detail to enable those skilled in the art to practice the embodiments of the claimed subject matter described herein. The embodiments may be combined, other embodiments may be utilized, or structural, logical, and electrical changes may be made without departing from the scope and spirit of the claimed subject matter. It should be understood that the embodiments described herein are not intended to limit the scope of the subject matter but rather to enable one skilled in the art to practice, make, and/or use the subject matter.

FIG. 1 is a block diagram of a processing device 100 for non-contact liquid sensing and determining an electric property of liquid 108 in a container 106 according to at least one embodiment. Processing device 100 includes analog processing blocks 110 and digital processing blocks 120. Analog processing blocks 110 are coupled to a first electrode 102 and a second electrode 104, first electrode 102 being located at a first point on an exterior surface of container 106 that holds liquid 108 and second electrode 104 being located at a second point on the exterior surface of container 106. Container 106 has an ambient ground 124 that represents the ambient grounding to surrounding objects. Analog processing blocks 110 include a multi-port network that is configured to couple a signal generator 112 (or multiple signal generators or excitation sources), a receiver channel 114 (also referred to as a current measurement circuit, and a ground potential to either one or both of first electrode 102 and second electrode 104 to determine a set of currents associated with first electrode 102, second electrode 104. For example, receiver channel 114 can be used to measure a first current associated with first electrode 102 (flowing in or out of first electrode 102) and a second current associated with second electrode 104. Using the first current and the second current, a third current associated with ambient ground 124 can be determined. Analog processing blocks 110 can operate at different operating frequencies. Different operating frequencies can be used to determine currents at different frequencies, which are used to determine a set of impedances, including an impedance of container 106 and liquid 108 together and an impedance of container 106. These impedances can be used to determine an impedance of liquid 108.

In at least one embodiment, signal generator 112 can be a wide frequency range harmonic signal generator. Signal generator 112 can produce excitation signals with low or high frequencies. Signal generator 112 can be an internal or external component. Using a large number of frequencies from low frequencies to high frequencies (e.g., 10 frequencies) can improve liquid quality estimation.

In one embodiment, analog processing blocks 110 include a current measurement circuit coupled to a multi-port network. The current measurement circuit includes signal generator 112 that generates an excitation signal at a first frequency and receiver channel 114 that measures a first set of currents associated with first electrode 102, second electrode 104, at the first frequency. Current through ambient ground 124 can be calculated for each corresponding frequency. In one embodiment, signal generator 112 is configured to generate an excitation signal, including a sine wave. Alternatively, signal generator 112 is configured to generate other types of excitation signals, such as other periodic waves or rectangular-shaped excitation signals (e.g., square waves). This first set of currents can be used to determine an impedance of container 106 and liquid 108 together. The capacitance measurement circuit measures a second set of currents associated with first electrode 102, second electrode 104, at a second frequency that is lower than the first frequency. In this embodiment, the second frequency is lower than the first frequency. In another embodiment, the second frequency is higher than the second frequency. Current through ambient ground 124 can be calculated for corresponding frequencies. This second set of currents can be used to determine an impedance of container 106. This allows an impedance of liquid 108 to be determined by removing the impact of the container 106 and environmental conditions. In some embodiments, an extra ground electrode (not illustrated in FIG. 1) can be located at container 106 to minimize grounding variation impact.

Digital processing blocks 120 can include one or more digital processing circuits that are coupled to analog processing blocks 110, such as using one or more digital to analog converters that convert analog signals to digital signals (also referred to as digital values or counts). In some embodiments, analog processing blocks 110 measure currents at one or more frequencies and send the measured currents to digital processing blocks 120 for further processing. For example, analog processing blocks 110 measure a first set of currents at a first frequency and a second set of currents at a second frequency. Analog processing blocks 100 convert first set of currents and second set of currents into digital values indicative of the first currents and the second currents. Digital processing blocks 120 determine independent impedances of container 106, liquid 108, and liquid 108 and container 106 using the digital values indicative of the first set of currents and the second set of currents. In other embodiments, analog processing blocks 110 measure capacitances (or charges indicative of capacitances) associated with electrodes that are located on an exterior surface of container 106 and convert capacitances to digital values that digital processing blocks 120 use to determine digital values indicative of first currents and second currents, as well as digital values indicative of the independent impedances of container 106, liquid 108, and liquid 108 and container 106 using the digital values indicative of the first set of currents and the second set of currents. Digital processing blocks 120 determine an electrical property of liquid 108 using the digital values indicative of independent impedances of liquid 108.

In one embodiment, hardware of processing device 100 measures all currents in a setup of container 106, the setup including at least first electrode 102 and second electrode 104. Processing device 100 can execute a method, such as in firmware to process measured currents to determine liquid properties, such as conductivity of liquid 108, permittivity of liquid 108, or the like. In some cases, a first set of electrodes is aligned on a first side of container 106 and a second set of electrodes is aligned on a second side of container 106, such as that the first and second set of electrodes can be used to determine a level of liquid 108. A level of liquid 108 can be used to determine a geometric model for determining an electrical property of liquid 108. Geometric parameters and liquid level can bind liquid resistance and capacitance with conductivity and permittivity. A geometric model can be simulated or measured for specific liquid containers and sensor designs. Geometric parameters can be defined by liquid geometry. If the liquid is in a container and can occupy different levels, its geometric parameter can be different. Combining liquid level and liquid properties can improve total accuracy. A temperature sensor can also be used for liquid classification, as liquid electric properties can change with temperature. To compensate for variations in properties, a temperature sensor can be used.

In one embodiment, analog processing blocks 110, operating at a first frequency, measures a first current indicative of a self-capacitance of first electrode 102 and measures a second current indicative of a mutual-capacitance between first electrode 102 and second electrode 104. Analog processing blocks 110, digital processing blocks 120, or both can determine a third current through ambient ground 124 at the first frequency using the first current and the second current. Analog processing blocks 110, operating at a second frequency that is different from the first frequency, measures a fourth current indicative of a self-capacitance of first electrode 102 and measures a fifth current indicative of a mutual-capacitance between first electrode 102 and second electrode 104. As noted here, the second frequency can be lower than the first frequency in some cases and can be higher than the first frequency in other cases. Analog processing blocks 110, digital processing blocks 120, or both can determine a sixth current through ambient ground 124 at the second frequency using the fourth current and the fifth current. It should be noted that analog processing blocks 110 convert measurements of charges, capacitances, and impedances into digital values and digital processing blocks 120 can determine digital values indicative of charges, capacitances, and impedances measured by analog processing blocks 110.

In another embodiment, analog processing blocks 110, operating at a first frequency, measures a first current indicative of a self-capacitance of first electrode 102 and measures a second current indicative of a self-capacitance of second electrode 104. Analog processing blocks 110, digital processing blocks 120, or both can determine a third current through ambient ground 124 at the first frequency using the first current and the second current. Analog processing blocks 110, operating at a second frequency that is different from the first frequency, measures a fourth current indicative of a self-capacitance of first electrode 102 and measures a fifth current indicative of a self-capacitance of second electrode 104. Analog processing blocks 110, digital processing blocks 120, or both can determine a sixth current through ambient ground 124 at the second frequency using the fourth current and the fifth current.

In one embodiment, digital processing blocks 120 determine the independent impedances of the container, the liquid, and the liquid and container, by determining a total impedance of container 106 and liquid 108 and an impedance of container 106. Digital processing block 120 determines the total impedance of both container 106 and liquid 108 using a first current, a second current, and a third current ambient through ground 124 at the first frequency. The first current is indicative of a self-capacitance of first electrode 102 and first electrode 102 can be located at a first point on an exterior surface of container 106. First electrode 102 can be part of a first set of electrodes. The second current is indicative of a mutual-capacitance between first electrode 102 and second electrode 104 and second electrode 104 is located at a second point on the exterior surface of the container. Second electrode 104 can be part of the first set of electrodes. Multiple sets of electrodes can be used to determine a level of liquid 108 in connection with, or in addition to, determining an electrical property of liquid 108. Digital processing blocks 120 determine a digital value indicative of the impedance of the container using digital values corresponding to a fourth current, a fifth current, and a sixth current through ambient ground 124 at the second frequency. The fourth current is indicative of a self-capacitance of first electrode 102 and fifth current is indicative of a mutual-capacitance between first electrode 102 and second electrode 104. Digital processing blocks 120 determine an impedance of liquid 108 using the total impedance of container 106 and liquid 108 and the impedance of container 106.

Figure 5A:
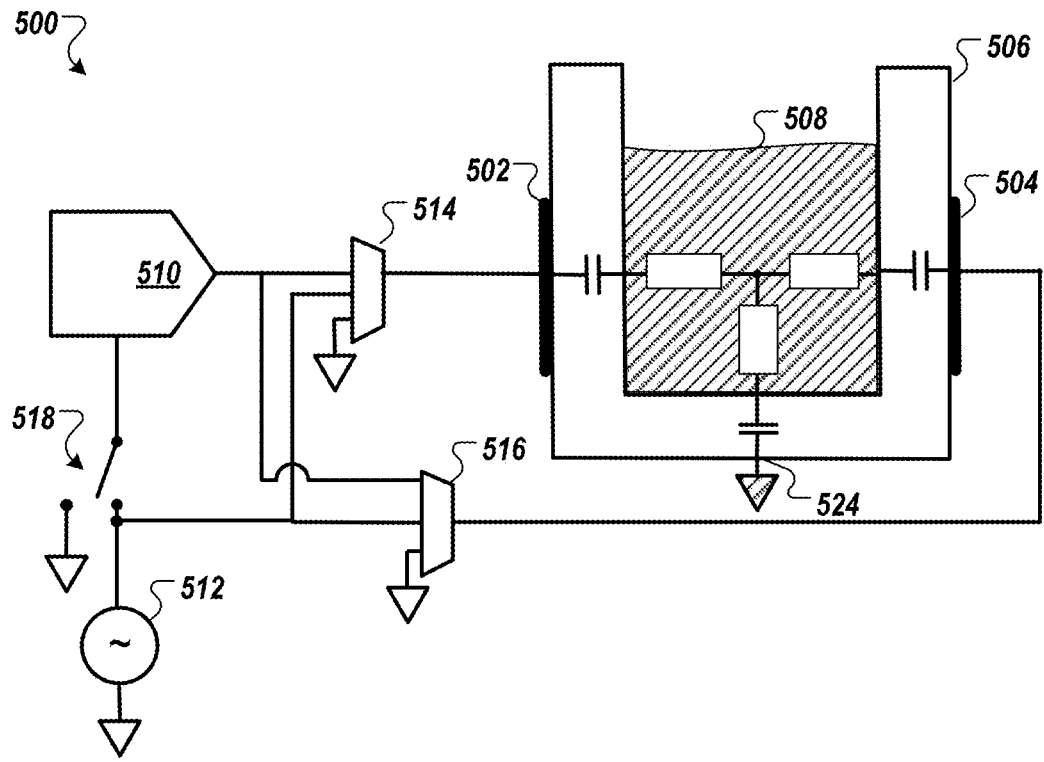
FIG. 5A is a circuit diagram of a capacitance measurement circuit with multiple multiplexers for non-contact liquid sensing according to at least one embodiment.
Figure 6:
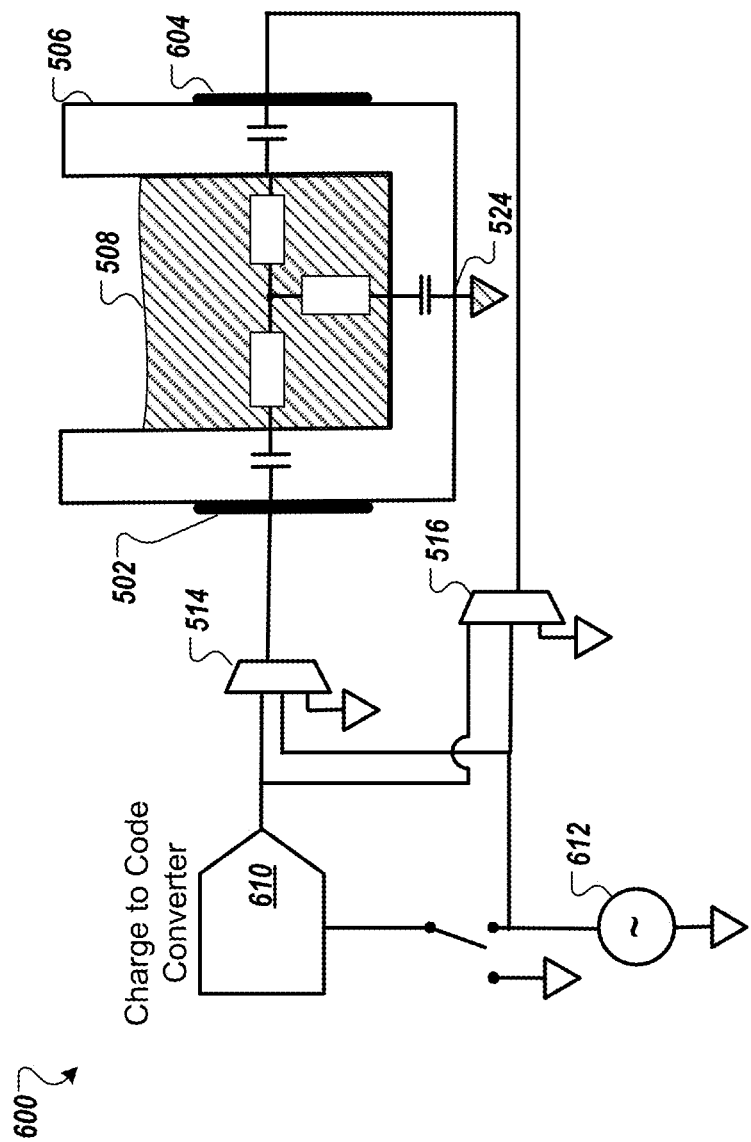
FIG. 6 is a circuit diagram of a charge measurement circuit with a receiver channel and a floating ground signal generator for non-contact liquid sensing according to at least one embodiment.

As illustrated in FIG. 1, a multi-port network can include multiple switches, such as first switch 116, second switch 118, and third switch 122. First switch 116, second switch 118, and third switch 122 can be used to connect first electrode 102 and second electrode 104 to signal generator 112, receiver channel 114, ambient ground 124, or any combination thereof. In another embodiment, a multi-port network can include multiple multiplexers, such as illustrated in FIG. 5A and FIG. 6.

Figure 5B:
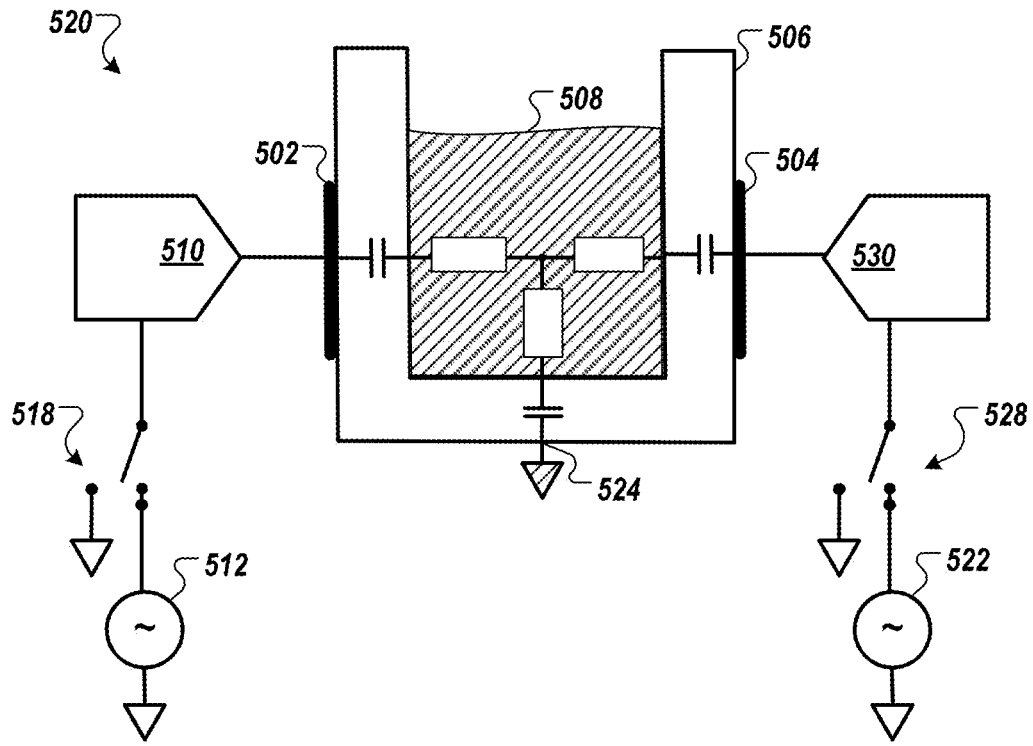
FIG. 5B is a circuit diagram of a capacitance measurement circuit with multiple receiver channels for non-contact liquid sensing according to at least one embodiment.

As illustrated in FIG. 1, a multi-port network can be coupled to a single receiver channel, receiver channel 114. In other embodiments, a multi-port network can be coupled to multiple receiver channels, such as a first receiver channel that is coupled to first electrode 102 and a second receiver channel that is coupled to second electrode 104, such as illustrated in FIG. 5B.

In one embodiment, analog processing blocks 110 can use harmonic excitation signals of low frequencies and high frequencies to eliminate the impact of the physical characteristic of container 106, such as the impact of the plastic container. Excitation signals at low and high frequencies allow current to be measured in complex forms for different excitation source locations using a multi-port network. Digital processing blocks 120 can perform a method that processes the measured currents using two or more circuit models. Circuit models are used to calculate independent impedances of the system. After impedances are determined, digital processing blocks 120 can use a geometric model to calculate the liquid electrical properties of liquid 108. In one embodiment, the method calculates independent impedances and calculates liquid electrical properties of liquid 108 are performed in firmware executed by processing device 100. Alternatively, processing device 100 can perform the method using synthesized logic, hardware accelerators, a hardware state machine, or the like.

It should be noted that although illustrated in a dashed box within analog processing block 110 for ease of illustration, container 106 and first electrode 102 and second electrode 104 are not part of the analog processing block, but rather electrode 102 and second electrode 104 are coupled to an exterior surface of container 106 and are coupled to terminals of processing device 100, such as general-purpose input-output (GPIO) pins.

Although FIG. 1 illustrates and describes a detailed analysis with respect to a three-port solution, in other embodiments, additional ports can be used. By using more ports, the solution can be more precise.

Figure 2:
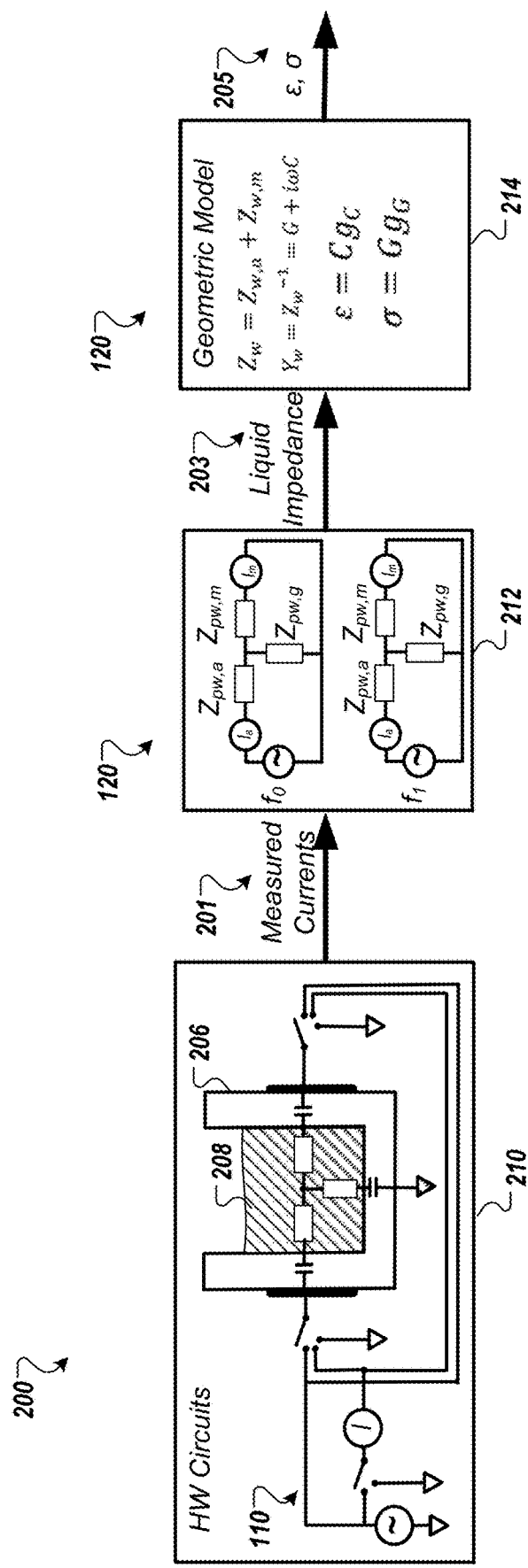
FIG. 2 is a flow diagram of processing stages of a processing device with non-contact liquid sensing according to at least one embodiment.

FIG. 2 is a flow diagram of processing stages of a processing device 200 with non-contact liquid sensing according to at least one embodiment. Processing device 200 is similar to processing device 100 as noted by similar reference numbers. Processing device 200 has at least three stages: a first stage 210, a second stage 212, and a third stage 214. In first stage 210, analog processing blocks 110 can measure a first set of currents associated with a first set of electrodes at a first frequency ($f_0$), the first set of electrodes being located on an exterior surface of a container 206 that holds a liquid 208. In one embodiment, analog processing blocks 110 measure a self-current, $I_1$ (also referred to as $I_a$) and a mutual-current, $I_2$, (also referred to as $I_m$). By measuring the self-current, $I_1$ and mutual-current, $I_2$, a third current, $I_3$ (also referred to as $I_g$) can be determined. Such measurements can be done for high excitation frequency to get a total impedance of container 206 and liquid 208. In first stage 210, analog processing blocks 110 can measure a second set of currents associated with the first set of electrodes at a second frequency ($f_1$), the second frequency being lower than the first frequency. As described herein, the excitation frequencies can be first and second excitation frequencies that are different. In the case of low frequencies, liquid 208 can behave as a conductor, isolating an impedance of a material of container 206. For example, container 206 can be plastic and liquid 208 can behave as a conductor as compared to the plastic of container 206, allowing plastic properties to be determined. As a result, it is possible to extract liquid impedance from the total impedance and the impedance of container 206. In first stage 210, analog processing blocks 110 can output or otherwise store measured currents 201, including at least the first set of currents and the second set of currents.

In second stage 212, digital processing blocks 120 can process measured currents 201 and can determine, using circuit models, independent impedances of container 206, liquid 208, and liquid 208 and container 206 together at the first frequency and the second frequency using the first set of currents and the second set of currents. Additional details of circuit models are described below with respect to FIG. 4. In second stage 212, digital processing blocks 120 can output or otherwise store a liquid impedance 203, including the independent impedances.

In third stage 214, digital processing blocks 120 can process liquid impedance 203 and determine, using a geometric model of container 206, an electrical property of the liquid using the independent impedances of liquid 208. In third stage 214, digital processing blocks 120 can output or otherwise store one or more electrical properties 205 of liquid 208.

In at least one embodiment, at first stage 210, analog processing blocks 110 measure a first current indicative of a self-capacitance of a first electrode (e.g., 102) of the first set of electrodes, the first electrode being located at a first point on the exterior surface of container 206. Analog processing blocks 110 measure a second current indicative of a mutual capacitance between the first electrode (e.g., 102) and a second electrode (e.g., 104) of the first set of electrodes, the second electrode being located at a second point on the exterior surface of container 206. At first stage 210, analog processing blocks 110 or digital processing blocks 120 determines a third current through an ambient ground at the first frequency using the first current and the second current. In at least one embodiment, at first stage 210, analog processing blocks 110 measure a fourth current indicative of a self-capacitance of the first electrode (e.g., 102) and measures a fifth current indicative of a mutual capacitance between the first electrode (e.g., 102) and the second electrode (e.g., 104). At first stage 210, analog processing blocks 110 or digital processing blocks 120 determines a sixth current through ambient ground (e.g., 124) at the second frequency using the fourth current and the fifth current.

In at least one embodiment, at first stage 210, analog processing blocks 110 measure a first current indicative of a self-capacitance of a first electrode (e.g., 102) of the first set of electrodes, the first electrode being located at a first point on the exterior surface of container 206 and measures a second current indicative of a self-capacitance of a second electrode (e.g., 104) of the first set of electrodes, the second electrode being located at a second point on the exterior surface of container 206. At first stage 210, analog processing blocks 110 or digital processing blocks 120 determines a third current through the ambient ground at the first frequency using the first current and the second current.

In at least one embodiment, at first stage 210, analog processing blocks 110 measure the first set of currents (and second set of currents) using a plurality of multiplexers and a sine wave floating ground sensing technique. Analog processing blocks 110 can include a signal generator that generates an excitation signal having a sine wave. The plurality of multiplexers can be configured to couple the signal generator to either first electrode or second electrode. The plurality of multiples can connect first electrode to ground or a receiver channel and can connect second electrode to ground or a receiver channel.

In at least one embodiment, at first stage 210 analog processing blocks 110 measure the first set of currents (and second set of currents) using a plurality of receiver channels and a sine wave floating ground sensing technique. For example, a first measurement channel of analog processing blocks 110 measures a first current indicative of a self-capacitance of a first electrode of the first set of electrodes, and a second measurement channel of analog processing circuit 110 measures a second current indicative of a mutual capacitance between the first electrode and a second electrode of the first set of electrodes. Analog processing blocks 110 or digital processing blocks 120 determines a third current through an ambient ground at the container at the first frequency using the first current and the second current. Similarly, a sixth current through the ambient ground at the second frequency can be determined using fourth and fifth currents in a similar manner.

In at least one embodiment, at second stage 212, digital processing blocks 120 determine a total impedance of container 206 and liquid 208 together using digital values indicative of a first current, a second current, and a third current through the ambient ground at the first frequency. The first current can be indicative of a self-capacitance of a first electrode of the first set of electrodes, the first electrode being located at a first point on an exterior surface of the container. The second current can be indicative of a mutual capacitance between the first electrode and a second electrode of the first set of electrodes, the second electrode being located at a second point on the exterior surface of the container. Digital processing blocks 120 determines an impedance of container 206 using digital values indicative of a fourth current, a fifth current, and a sixth current through the ambient ground at the second frequency. The fourth current can indicative of a self-capacitance of the first electrode. The fifth current can be indicative of a mutual capacitance between the first electrode and the second electrode. Digital processing blocks 120 determines an impedance of liquid 208 using the total impedance of container 206 and liquid 208 and the impedance of container 206. Additional details of determining and removing the impact of dielectric walls of a container to calculate liquid properties are illustrated and described below with respect to FIG. 3.

In at least one embodiment, at third stage 214, digital processing blocks 120 determines the electrical property of liquid 208 by converting the impedance of liquid 208 into the electrical property using a geometric model.

Figure 3:
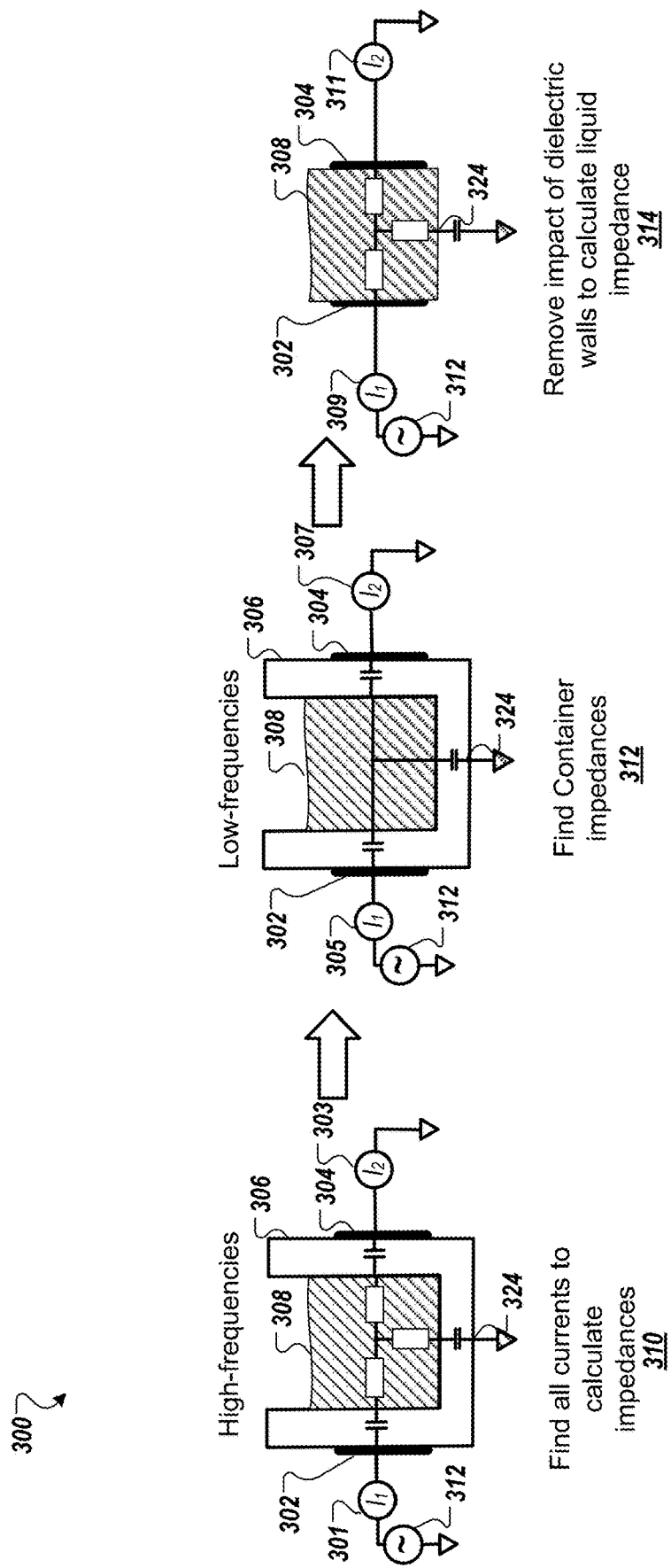
FIG. 3 is a flow diagram of processing sub-stages of a processing device with non-contact liquid sensing according to at least one embodiment.

FIG. 3 is a flow diagram of processing sub-stages 300 of a processing device with non-contact liquid sensing according to at least one embodiment. Processing device with processing sub-stages 300 is similar to processing device 100 and processing device 200 as noted by similar reference numbers. Processing device has at least three stages: a first stage 210, a second stage 212, and a third stage 214, and during second stage 212, digital processing blocks 120 processes digital values indicative of the measured currents in three sub-stages: a first sub-stage 312, a second sub-stage 314, and a third sub-stage 316. As described above, by measuring the self-current, $I_1$ and mutual-current, $I_2$, a third current, $I_3$ (also referred to as $I_g$) can be determined. Such measurements can be done for high excitation frequency to get a total impedance of container 306 and liquid 308. The currents can be converted to digital values for processing by digital processing blocks 120. In a first sub-stage 312, analog processing blocks 110 can determine all currents, including a first current 301, a second current 303, and a third current (not labeled in FIG. 3) through ambient ground 324 and converts first current 301, second current 303, and third current into digital values. Digital processing blocks 120 uses the digital values indicative of currents to calculate impedances at a first frequency ($f_0$). That is, signal generator 312 operates at a first frequency ($f_0$). In the case of low frequencies, liquid 308 can behave as a conductor, isolating an impedance of a material of container 306. In a second sub-stage 314, digital processing blocks 120 (or analog processing blocks 110) can determine all currents, including a fourth current 305, a fifth current 307, and a sixth current (not labeled in FIG. 3) through ambient ground 324 and uses the currents to calculate impedances at a second frequency ($f_1$) that is lower than the first frequency ($f_0$). That is, signal generator 312 operates at a second frequency ($f_1$). For example, container 306 can be plastic and liquid 308 can behave as a conductor as compared to the plastic of container 306, allowing plastic properties to be determined and removed to isolate an impedance of liquid 308 as shown in a third sub-stage 314. In a third sub-stage 314, it is possible to subtract an impedance of container 308, determined at second sub-stage 314) from the total impedance, determined at first sub-stage 312), to obtain an impedance of liquid 308.

Figure 4A:
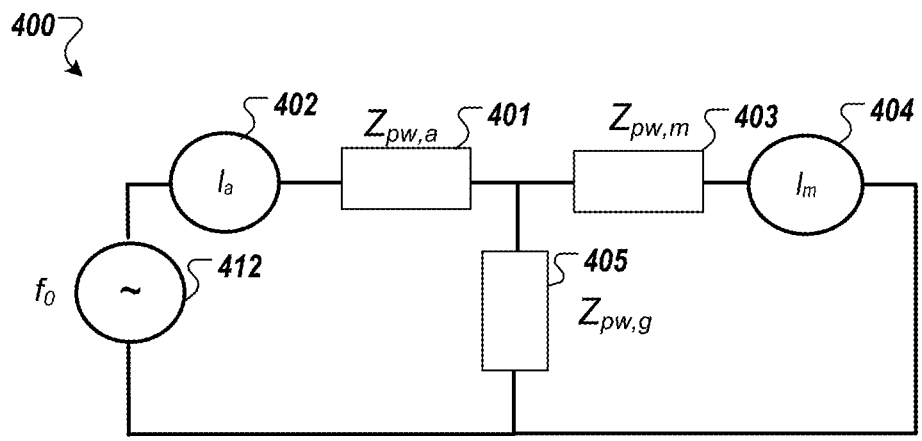
FIG. 4A is a circuit diagram of a first circuit model according to at least one embodiment.
Figure 4B:
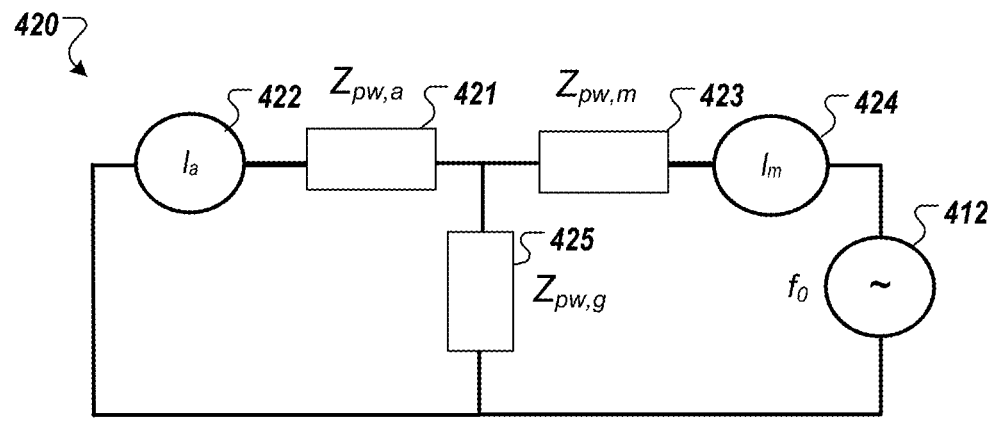
FIG. 4B is a circuit diagram of a second circuit model according to at least one embodiment.
Figure 4C:
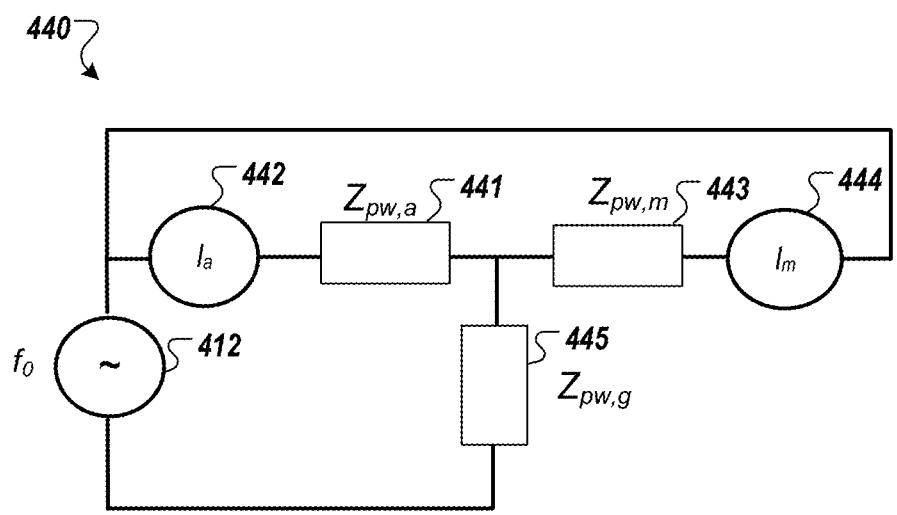
FIG. 4C is a circuit diagram of a third circuit model according to at least one embodiment.

In at least one embodiment, different connections in hardware circuitry, such as using a multi-port network, can have corresponding equivalent electrical circuits, such as illustrated in FIGS. 4A-4C and set forth in Table 1 below.

FIGS. 4A-4C are circuit diagrams of a first circuit model, a second circuit mode, and a third circuit model according to various embodiments. The first circuit mode, the second circuit model, and the third circuit model are equivalent circuits that are used to calculate a total impedance, an impedance of a container, and ultimately an impedance of a liquid held in a container. For example, these equivalent circuits can be used to calculate plastic and liquid impedances. At least one benefit of such circuit representations is the impedances of T-like equivalent circuits, as illustrated in FIGS. 4A-4C, do not depend on an excitation source or load connections. As a result, different source connections create four linearly independent equations that can be solved to determine impedances.

TABLE 1

Equivalent Electrical Circuits and Corresponding Equations

| # | Electrical circuit | Equations | Description |
|---|---|---|---|
| 1 | See FIG. 4A | $V = I_{a1}Z_{pw,a} + I_{m1}Z_{pw,m}$ <br> $V = I_{a1}Z_{pw,a} + (I_{a1} - I_{m1})Z_{pw,g}$ | Self-current and mutual-current can be measured separately or simultaneous |
| 2 | See FIG. 4B | $V = I_{m2}Z_{pw,m} + I_{a2}Z_{pw,a}$ <br> $V = I_{m2}Z_{pw,m} + (I_{m2} - I_{a2})Z_{pw,g}$ | |
| 3 | See FIG. 4C | $V = I_{a3}Z_{pw,a} + (I_{a3} + I_{m3})Z_{pw,g}$ <br> $V = I_{m3}Z_{pw,m} + (I_{a3} + I_{m3})Z_{pw,g}$ | Self-currents can be measured on each side of the electrical circuit or total self-current can be measured |

Referring to FIG. 4A, a first circuit model 400 includes a signal generator 412 that is coupled to a first electrode (e.g., 102). Signal generator 412 can be used to measure a self-current 402 ($I_a$) and a mutual-current 404 ($I_m$) at high frequencies and low frequencies. Using a voltage of signal generator 412, a first impedance 401 ($Z_{pw,a}$), and second impedance 403 ($Z_{pw,m}$), and a third impedance 405 ($Z_{pw,g}$) can be determined using four linearly independent equations. For example, using equations for first circuit model 400, it is possible to calculate mixed impedances $Z_{pw,a}$, $Z_{pw,m}$, and $Z_{pw,g}$ of the system for high-frequency measurements (mixed impedances include impedances of container and liquid together), as set forth below in equation (1):

$$\begin{bmatrix} I_{a1} & I_{m1} & 0 \\ I_{a1} & 0 & (I_{a1} - I_{m1}) \\ I_{a2} & I_{m2} & 0 \\ 0 & I_{m2} & (I_{m2} - I_{a2}) \\ I_{a3} & 0 & (I_{a3} + I_{m3}) \\ 0 & I_{m3} & (I_{a3} + I_{m3}) \end{bmatrix} \begin{bmatrix} Z_{pw,a} \\ Z_{pw,m} \\ Z_{pw,g} \end{bmatrix} = \begin{bmatrix} V \\ V \\ V \\ V \\ V \\ V \end{bmatrix}$$

Referring to FIG. 4B, a second circuit model 420 includes a signal generator 412 coupled to a second electrode (e.g., 102), but is otherwise similar to first circuit model 400. Signal generator 412 can be used to measure a self-current 422 ($I_a$) and a mutual-current 424 ($I_m$) at high frequencies and low frequencies. Using a voltage of signal generator 412, a fourth impedance 421 ($Z_{pw,a}$), and a fifth impedance 423 ($Z_{pw,m}$), and a sixth impedance 425 ($Z_{pw,g}$) can be determined using four linearly independent equations. For example, using equations for second circuit model 420, it is possible to calculate mixed impedances $Z_{pw,a}$, $Z_{pw,m}$, and $Z_{pw,g}$ of the system for high-frequency measurements (mixed impedances include impedances of container and liquid together), as set forth in equation (1) above.

Referring to FIG. 4C, a third circuit model 440 includes a signal generator 412 that is coupled to both a first electrode (e.g., 102) and a second electrode (e.g., 104). Signal generator 412 can be used to measure a self-current 442 ($I_a$) and a mutual-current 444 ($I_m$) at high frequencies and low frequencies. Using a voltage of signal generator 412, a seventh impedance 441 ($Z_{pw,a}$), and an eighth impedance 443 ($Z_{pw,m}$), and a ninth impedance 445 ($Z_{pw,g}$) can be determined using four linearly independent equations. For example, using equations for third circuit model 440, it is possible to calculate mixed impedances $Z_{pw,a}$, $Z_{pw,m}$, and $Z_{pw,g}$ of the system for high-frequency measurements (mixed impedances include impedances of container and liquid together), as set forth in equation (1) above.

Low-frequency measurement allows finding container impedances $Z_{p,a}$, $Z_{p,m}$, and $Z_{p,g}$, as set forth below in equation (2).

$$\begin{bmatrix} I_{a1} & I_{m1} & 0 \\ I_{a1} & 0 & (I_{a1} - I_{m1}) \\ I_{a2} & I_{m2} & 0 \\ 0 & I_{m2} & (I_{m2} - I_{a2}) \\ I_{a3} & 0 & (I_{a3} + I_{m3}) \\ 0 & I_{m3} & (I_{a3} + I_{m3}) \end{bmatrix} \begin{bmatrix} Z_{p,a} \\ Z_{p,m} \\ Z_{p,g} \end{bmatrix} = \begin{bmatrix} V \\ V \\ V \\ V \\ V \\ V \end{bmatrix}$$

Using mixed impedances $Z_{pw,a}$, $Z_{pw,m}$, and $Z_{pw,g}$ and container impedances $Z_{p,a}$, $Z_{p,m}$, and $Z_{p,g}$, liquid impedance can be calculated, as set forth below in equations (3):

$$Z_{w,a} = Z_{pw,a} - Z_{p,a}$$

$$Z_{w,m} = Z_{pw,m} - Z_{p,m}$$

$$Z_{w,g} = Z_{pw,g} - Z_{p,g}$$

The liquid impedance can be converted to capacitance and resistance as set forth in equations (4):

$$Z_w = Z_{w,a} + Z_{w,m}$$

$$Y_w = Z_w^{-1} = G + i\omega C$$

Geometrical parameters of a container can be simulated or measured. The simulated or measured geometrical parameters ($g_C$ and $g_G$) can be used to determine an electrical property of a liquid in the container, such a permittivity ($\varepsilon$) of liquid or conductivity ($\sigma$) of liquid as set forth in equations (5):

$$\varepsilon = Cg_C = \frac{L}{M_C S \varepsilon_0}$$

$$\sigma = Gg_G = \frac{L}{M_G S}$$

Permittivity ($\varepsilon$) and conductivity ($\sigma$) are examples of electrical properties of liquid that can be computed. It should be noted that geometric parameters define current flow through a liquid from a first electrode (e.g., Tx-electrode) to a second electrode (e.g., Rx-electrode) without grounding effect.

It should be noted that the self-currents and mutual-currents can be measured separately or simultaneously.

Referring back to FIG. 3, to determine one or more electrical properties of a liquid in a container, the following steps can be performed: Use high-frequency excitation to measure mixed impedance; define grounding effect; use low-frequency excitation to estimate container wall impedance; define ground effect; split liquid and plastic impedances; remove the impact of container walls (e.g., plastic walls); select proper electrodes for liquid electric parameters evaluation (e.g., the liquid level solution only); and use geometric parameters to convert liquid impedance into liquid electric parameters. It should be noted that a sequence of low-frequencies measurements and then high-frequency measurements can be reversed as the order does not matter.

FIG. 5A is a circuit diagram of a capacitance measurement circuit 500 with multiple multiplexers for non-contact liquid sensing according to at least one embodiment. Capacitance measurement circuit 500 includes a signal generator 512 that generates an excitation signal, a receiver channel 510 (charge or current measurement circuits), a first multiplexer 514, and a second multiple 516. First multiplexer 514 and second multiplexer 516 can be part of a multi-port network that allows various connections between signal generator 512, receiver channel 510, and first electrode 502 and second electrode 504. As illustrated in FIG. 5A, first multiplexer 514 is coupled to first electrode 502, and second multiplexer 516 is coupled to second electrode 504. As described above, first electrode 502 and second electrode 504 are located on an exterior surface of a container 506 that holds a liquid 508. Container 506 has an ambient ground 524 caused by the environment. First multiplexer 514 is coupled to ambient ground 524, signal generator 512, and receiver channel 510. Second multiplexer 516 is coupled to ambient ground 524, signal generator 512, and receiver channel 510. First and second multiplexers 514 and 516 can be used to selectively connect receiver channel 510 to one or both of, first electrode 502 and second electrode 504. First and second multiplexers 514 and 516 can be used to selectively connect signal generator 512 to one or both of, first electrode 502 and second electrode 504. First and second multiplexer 514, 516 can be used to selectively connect the ambient ground 524 to either one of, or both of, first electrode 502 and second electrode 504.

Signal generator 512 can also be selectively coupled to receiver channel 510, first multiplexer 514, and second multiplexer 516 using a switch 518. In this embodiment, receiver channel 510 can be a single receiver channel that is used for both self-current and mutual-current measurements as described herein. Alternatively, different circuits can be used to separately measure self-currents and mutual-currents. In other embodiments, multiple receiver channels, multiple signal generators, or both multiple receiver channels and multiple signal generators can be used, such as illustrated in FIG. 5B.

FIG. 5B is a circuit diagram of a capacitance measurement circuit 520 with multiple receiver channels for non-contact liquid sensing according to at least one embodiment. Capacitance measurement circuit 520 includes a signal generator 512 that generates an excitation signal, a receiver channel 510, a second signal generator 522, and a second receiver channel 530. As illustrated in FIG. 5B, receiver channel 510 is coupled to first electrode 502, and second receiver channel 530 is coupled to second electrode 504. As described above, first electrode 502 and second electrode 504 are located on an exterior surface of a container 506 that holds a liquid 508. Container 506 has ambient ground 524. Signal generator 512 can also be selectively coupled to receiver channel 510 using a switch 518 and second signal generator 522 can be selectively coupled to a second receiver channel 530 using a second switch 528. In this embodiment, receiver channel 510 and second receiver channel 530 can be receiver channels that are used in different combinations for both self-current and mutual-current measurements as described herein. Alternatively, different circuits with each of the receiver channels can be used to separately measure self-currents and mutual-currents.

It should be noted that currents can be measured by connecting currents to different electrodes and measuring currents to or from different electrodes for data processing. Measuring currents can be done as a sine wave floating ground sensing technique with multiplexers, as illustrated in FIG. 5A. Measuring currents can be done as a sine wave floating ground sensing technique with multiple channels, as illustrated in FIG. 5B. In other embodiments, other circuits can be used to create similar low power source solutions by combining sinusoidal excitation using a floating ground and self-capacitance and mutual-capacitance measurements, such as illustrated in FIG. 6. This provides a multi-electrode, non-contact liquid property sensing solution.

FIG. 6 is a circuit diagram of a charge measurement circuit 600 with a receiver channel 610 (e.g., charge to code converter) and a floating-ground signal generator 612 for non-contact liquid sensing according to at least one embodiment. Charge measurement circuit 600 is similar to capacitance measurement circuit 500 as noted by similar reference numbers, except Receive channel 610 can operate with or without a floating ground. A floating-ground signal generator can be used as the supply ground for the operational amplifier that differs from an earth ground.

As set forth above, instead of using approaches that just measure self-capacitance or mutual-capacitance, the embodiments described herein a multi-port network to determine current flows in the container setup and extract liquid properties. Using a multi-port network, such as illustrated in FIG. 1, and a combination of self-capacitance and mutual-capacitance sensing at multiple frequency ranges allows environmental parameters to be determined, enabling liquid properties to be isolated from the container and the environment properties. In other embodiments, other charge measurement solutions can be used.

Some electrodes can cause different parasitic capacitances during operation. In order to preserve properties of equivalent electric circuit models, such as those set forth in Table 1 above, active shield and grounding electrodes can be used to achieve better accuracy, such as illustrated in FIG. 7A.

Figure 7A:
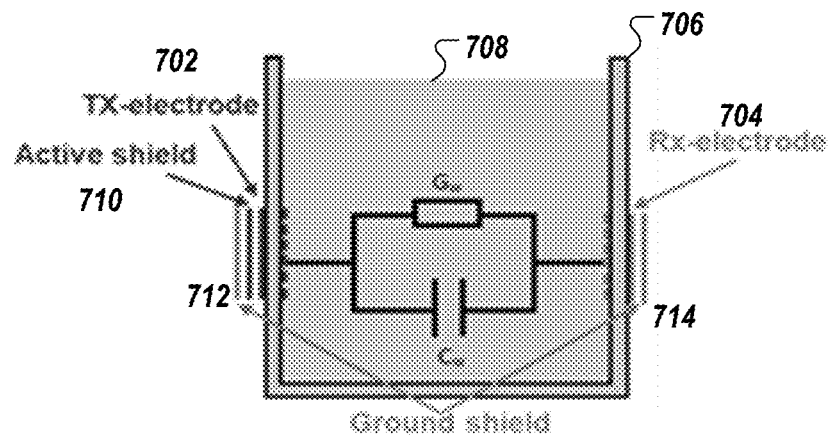
FIG. 7A illustrates a sensor setup with a first electrode, an active shield electrode, a second electrode, and two ground shield electrodes according to at least one embodiment.

FIG. 7A illustrates a sensor setup 700 with a first electrode, an active shield electrode, a second electrode, and two ground shield electrodes according to at least one embodiment. Sensor setup 700 includes a first electrode 702 located on a first side of a container 706 that hold liquid 708, a second electrode 704 located on a second side of container 706, as well as an active shield electrode 710 disposed in proximity to first electrode 702. A first ground shield electrode 712 is disposed in proximity to first electrode 702 and a second ground shield electrode 714 is disposed in proximity to second electrode 704. As described above, active shield electrode 710, ground shield electrodes, or both can be used to achieve higher accuracy of measurements.

Figure 7B:
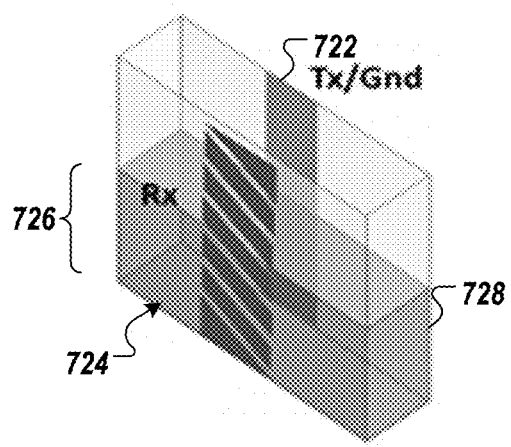
FIG. 7B illustrates a sensor setup with a transmit electrode on one side of a container and a set of receiver electrodes on another side of the container according to at least one embodiment.

The embodiments described herein allow liquid permittivity and conductivity to be measured. The embodiments described herein are not sensitive to grounding and variating properties of dielectric walls. As described herein, self-currents measurements and mutual-currents measurement can remove the grounding impact that is present in some environmental conditions. High-frequency measurements and low-frequency measurements can allow liquid and container electrical properties to be determined separately, making the solution independent from manufacturing tolerances, temperatures, and wall coatings. By combining the multi-port network and the algorithms described herein, absolute values of electric properties of liquid can be defined, making the solution stable to film and foam that may be on some of the walls of a container. In some embodiments, a standalone liquid level sensing can be performed. In other embodiments, the liquid level sensing can be combined with liquid properties sensing to achieve better accuracy, such as illustrated in FIG. 7B. It should be noted that in other embodiments, there can be different ground electrodes or electrodes with different potentials to minimize grounding impact. In other embodiments, it is possible to use self-capacitance measurements only, but such may provide less accuracy in liquid property estimations. An equivalent electric circuit, such as set forth in Table 1 above, measures current from sources at two electrodes and does not measure a current that passes through a liquid in a container.

FIG. 7B illustrates a sensor setup 720 with a transmit electrode on one side of a container and a set of receiver electrodes on another side of the container according to at least one embodiment. Sensor setup 720 includes a first transmit electrode 722, located on a first side of a container, and a set of receiver electrodes 724 that are located on a second side of the container. First transmit electrode 722 can extend in a first direction over a height of the container, whereas collectively the set of receiver electrodes 724 extend in the first direction over the height of the container, but each electrode of the set of receiver electrodes is smaller in size than transmit electrode 722. An excitation signal can be applied to transmit electrode 722 and measured on each electrode of set of electrodes 724 to determine a level 726 of liquid 728 being held by the container. As described above, liquid properties sensing, as set forth above, can be combined with liquid level sensing. As such, there can be different combinations and numbers of electrodes being used with a multi-port network and the sensing algorithms described herein. For example, one of electrodes 724 covered by liquid 728 can be used by a receiver and another by a transmitter. It should be noted that there can be other implementations than the implementation shown in FIG. 7B for determining a level of liquid being held by the container.

Figure 8:
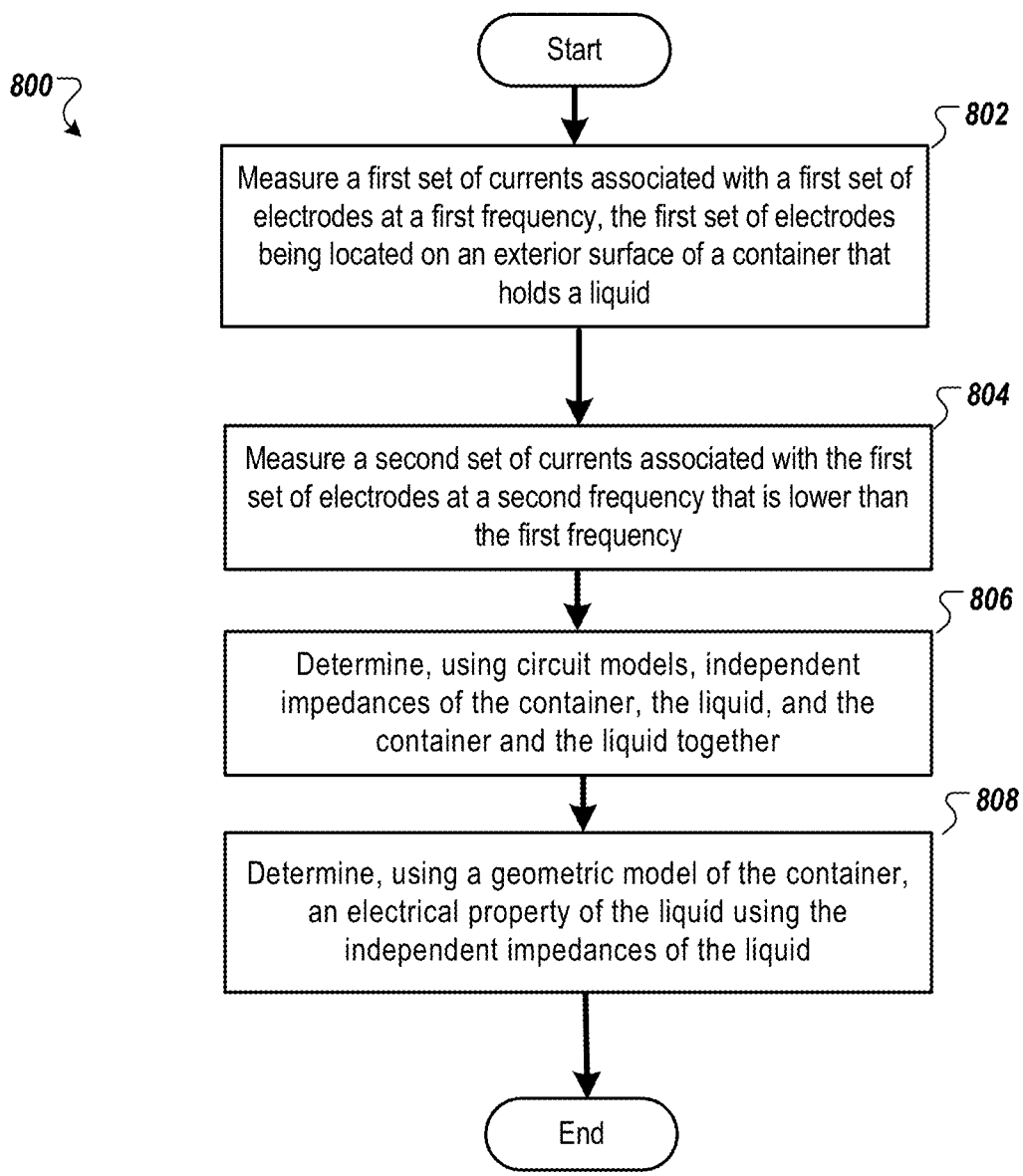
FIG. 8 is a flow diagram of a method of operating a processing device for non-contact liquid sensing to determine an electric property of liquid in a container according to at least one embodiment.

FIG. 8 is a flow diagram of a method 800 of operating a processing device for non-contact liquid sensing to determine an electric property of liquid in a container according to at least one embodiment. The method 800 may be performed by processing logic that comprises hardware (e.g., circuitry, dedicated logic, programmable logic, microcode, etc.), software, firmware, or a combination thereof. In one embodiment, the method 800 may be performed by any of the circuits described herein. In one embodiment, the method 800 is performed by processing device 100 of FIG. 1. In another embodiment, the method 800 is performed by processing device 200 of FIG. 2. In another embodiment, the method 800 is performed by processing device of FIG. 3. In another embodiment, the method 800 is performed by a device that includes a capacitive touch-sensing channel and a processing device coupled to the capacitive touch-sensing channel. Alternatively, the method 800 can be performed by other circuits that perform the various operations described herein.

Referring back to FIG. 8, method 800 begins by the processing logic measuring a first set of currents associated with a first set of electrodes at a first frequency, the first set of electrodes being located on an exterior surface of a container that holds a liquid (block 802). Processing logic measures a second set of currents associated with the first set of electrodes at a second frequency that is different from the first frequency (block 804). Processing logic determines, using circuit models, independent impedances of the container, the liquid, and the liquid and container using the first set of currents and the second set of currents (block 806). Processing logic determines, using a geometric model of the container, an electrical property of the liquid using the independent impedances of the liquid (block 808), and the method 800 ends.

In a further embodiment, processing logic measures the first set of currents by measuring a first current indicative of a self-capacitance of a first electrode of the first set of electrodes and a second current indicative of a mutual capacitance between the first electrode and a second electrode of the first set of electrodes. The first electrode is located at a first point on the exterior surface of the container and the second electrode is located at a second point on the exterior surface of the container. Processing logic determines a third current through ambient ground at the first frequency using the first current and the second current. Processing logic measures the second set of currents by measuring a fourth current indicative of a self-capacitance of the first electrode and a fifth current indicative of a mutual capacitance between the first electrode and the second electrode. Processing logic determines a sixth current through ambient ground at the second frequency using the fourth current and the fifth current.

In at least one embodiment, processing logic determines the independent impedances of the container, the liquid, and the liquid and container by determining a total impedance of the container and liquid using a first current, a second current, and a third current through the ambient ground at the first frequency. The first current is indicative of a self-capacitance of a first electrode of the first set of electrodes and the second current being indicative of a mutual capacitance between the first electrode and a second electrode of the first set of electrodes. The first electrode is located at a first point on an exterior surface of the container and the second electrode is located at a second point on the exterior surface of the container. Processing logic determines an impedance of the container using a fourth current, a fifth current, and a sixth current through the ambient ground at the second frequency. The fourth current is indicative of a self-capacitance of the first electrode and the fifth current is indicative of a mutual capacitance between the first electrode and the second electrode. Processing logic determines an impedance of the liquid using the total impedance of the container and the liquid and the impedance of the container. In at least one embodiment, the electrical property of the liquid is determined by converting the impedance of the liquid into electrical properties using the geometric model.

In some embodiments, the processing logic can control one or more multiplexers to measure currents. In other embodiments, processing logic can control one or more signal generators. The signal generators can be used for a sine wave floating ground sensing technique.

In at least one embodiment, processing logic measures, using a first measurement channel, a first current indicative of a self-capacitance of a first electrode of the first set of electrodes. Processing logic can measure, using a second measurement channel, a second current indicative of a mutual capacitance between the first electrode and a second electrode of the first set of electrodes. The first electrode is located at a first point on the exterior surface of the container and the second electrode being located at a second point on the exterior surface of the container. Processing logic determines a third current through ambient ground at the first frequency using the first current and the second current.

In another embodiment, processing logic measures a first current indicative of a self-capacitance of a first electrode of the first set of electrodes and a second current indicative of a self-capacitance of a second electrode of the first set of electrodes. The first electrode is located at a first point on the exterior surface of the container and the second electrode is located at a second point on the exterior surface of the container. Processing logic determines a third current through ambient ground at the first frequency using the first current and the second current.

In another embodiment, the method 900 can be performed using more than two frequencies as described herein. Precision of the estimate may increase as more frequencies are used.

Figure 9:
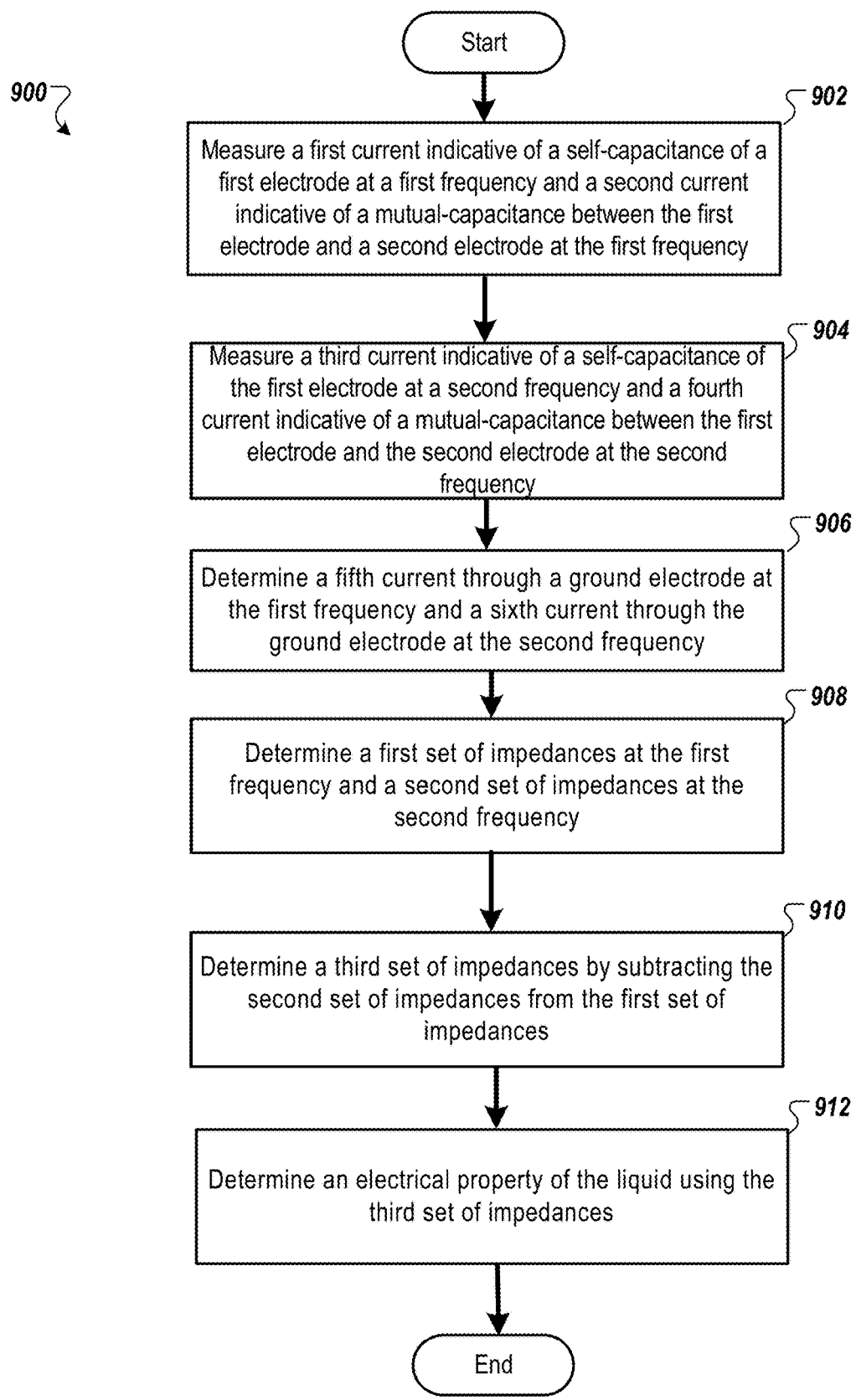
FIG. 9 is a flow diagram of a method of determining an electric property of liquid in a container according to at least one embodiment.

FIG. 9 is a flow diagram of a method 900 of determining an electric property of liquid in a container according to at least one embodiment. The method 900 may be performed by processing logic that comprises hardware (e.g., circuitry, dedicated logic, programmable logic, microcode, etc.), software, firmware, or a combination thereof. In one embodiment, the method 900 may be performed by any of the circuits described herein. In one embodiment, the method 900 is performed by processing device 100 of FIG. 1. In another embodiment, the method 900 is performed by processing device 200 of FIG. 2. In another embodiment, the method 900 is performed by processing device of FIG. 3. In another embodiment, the method 900 is performed by a device that includes a capacitive touch-sensing channel and a processing device coupled to the capacitive touch-sensing channel. Alternatively, the method 900 can be performed by other circuits that perform the various operations described herein.

Referring back to FIG. 9, method 900 begins by the processing logic measuring a first current indicative of a self-capacitance of a first electrode at a first frequency, and a second current indicative of a mutual capacitance between the first electrode and a second electrode at the first frequency (block 902). The first electrode is located at a first point on an exterior surface of a container that holds a liquid and the second electrode is located at a second point on the exterior surface of the container. Processing logic measures a third current indicative of a self-capacitance of the first electrode at a second frequency, and a fourth current indicative of a mutual capacitance between the first electrode and the second electrode at the second frequency (block 904). Processing logic determines a fifth current through the ambient ground at the first frequency using the first current and the second current and a sixth current through the ambient ground at the second frequency using the third current and the fourth current (block 906). The ambient ground cannot be removed because of coupling to surrounding objects. Processing logic determines a first set of impedances at the first frequency using the first, second, and fifth currents and a second set of impedances at the second frequency using the third, fourth, and sixth currents (block 908). The first set of impedances corresponds to a total impedance of the container and the liquid and the second set of impedances corresponds to an impedance of the container. Processing logic determines a third set of impedances by subtracting the second set of impedances from the first set of impedances (block 910). The third set of impedances corresponds to an impedance of the liquid held in the container. Processing logic determines an electrical property of the liquid using the third set of impedances corresponding to the impedance of the liquid (block 912), and the method 900 ends.

In a further embodiment, the first frequency is higher than the second frequency and the second frequency corresponds to a frequency at which the liquid behaves as a conductor as compared to a type of material used for the container. In at least one embodiment, the first electrode is part of a first set of electrodes and the second electrode is part of a second set of electrodes. The first set and the second set of electrodes can be arranged in a manner that corresponds to different levels of liquid in the container. Processing logic determines a current level of the liquid in the container using the first set of electrodes and the second set of electrodes.

In at least one embodiment, the processing logic determines the first set of impedances comprises solving a first system of equations using the first, second, and fifth currents and at least two circuit models each having a T-like equivalent circuit. The T-like equivalent circuit has a first impedance at the first electrode, a second impedance at the second electrode, and a third impedance at the ambient ground. Processing logic determines the second set of impedances comprises solving a second system of equations using the third, fourth, and sixth currents and the at least two circuit models. In a further embodiment, processing logic determines at least one of a permittivity of the liquid or a conductivity of the liquid using the third set of impedances and a set of geometrical parameters of the container.

In the above description, some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "allocating," "dynamically allocating," "redistributing," "ignoring," "reallocating," "detecting," "performing," "polling," "registering," "monitoring," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding, or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The methods and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods, and so forth, in order to provide a good understanding of several embodiments of the present disclosure. It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    measuring, by a processing device, a first set of currents associated with a first set of electrodes at a first frequency, the first set of electrodes being located on an exterior surface of a container that holds a liquid;
    measuring, by the processing device, a second set of currents associated with the first set of electrodes at a second frequency that is lower than the first frequency;
    determining, by the processing device using circuit models, independent impedances of the container, the liquid, and the liquid and container using the first set of currents and the second set of currents; and
    determining, by the processing device using a geometric model of the container, an electrical property of the liquid using the independent impedances of the liquid.

2. The method of claim 1, wherein measuring the first set of currents comprises:
    measuring, by the processing device, a first current indicative of a self-capacitance of a first electrode of the first set of electrodes, the first electrode being located at a first point on the exterior surface of the container;
    measuring, by the processing device, a second current indicative of a mutual-capacitance between the first electrode and a second electrode of the first set of electrodes, the second electrode being located at a second point on the exterior surface of the container; and
    determining, by the processing device, a third current through ambient ground at the first frequency using the first current and the second current.

3. The method of claim 2, wherein measuring the second set of currents comprises:
    measuring, by the processing device, a fourth current indicative of a self-capacitance of the first electrode;
    measuring, by the processing device, a fifth current indicative of a mutual-capacitance between the first electrode and the second electrode; and
    determining, by the processing device, a sixth current through ambient ground at the second frequency using the fourth current and the fifth current.

4. The method of claim 1, wherein determining independent impedances of the container, the liquid, and the liquid and container using the first set of currents and the second set of currents comprises:
   determining, by the processing device, a total impedance of the container and liquid using a first current, a second current, and a third current through ambient ground at the first frequency, the first current being indicative of a self-capacitance of a first electrode of the first set of electrodes, the first electrode being located at a first point on an exterior surface of the container, the second current being indicative of a mutual-capacitance between the first electrode and a second electrode of the first set of electrodes, the second electrode being located at a second point on the exterior surface of the container;
   determining, by the processing device, an impedance of the container using a fourth current, a fifth current, and a sixth current through ambient ground at the second frequency, the fourth current being indicative of a self-capacitance of the first electrode, the fifth current being indicative of a mutual-capacitance between the first electrode and the second electrode; and
   determining, by the processing device, an impedance of the liquid using the total impedance of the container and the liquid and the impedance of the container.

5. The method of claim 4, wherein determining the electrical property of the liquid comprises converting the impedance of the liquid into the electrical property using the geometric model.

6. The method of claim 1, wherein measuring the first set of currents comprises measuring the first set of currents using a plurality of multiplexers and a sine wave floating ground sensing technique.

7. The method of claim 1, wherein measuring the first set of currents comprises
   measuring, by a first measurement channel of the processing device, a first current indicative of a self-capacitance of a first electrode of the first set of electrodes, the first electrode being located at a first point on the exterior surface of the container;
   measuring, by a second measurement channel of the processing device, a second current indicative of a mutual-capacitance between the first electrode and a second electrode of the first set of electrodes, the second electrode being located at a second point on the exterior surface of the container; and
   determining, by the processing device, a third current through ambient ground at the first frequency using the first current and the second current.

8. The method of claim 1, wherein measuring the first set of currents comprises
   measuring, by the processing device, a first current indicative of a self-capacitance of a first electrode of the first set of electrodes, the first electrode being located at a first point on the exterior surface of the container;
   measuring, by the processing device, a second current indicative of a self-capacitance of a second electrode of the first set of electrodes, the second electrode being located at a second point on the exterior surface of the container; and
   determining, by the processing device, a third current through ambient ground at the first frequency using the first current and the second current.

9. A method comprising:
   measuring, by a processing device, a first current indicative of a self-capacitance of a first electrode at a first frequency, a second current indicative of a mutual-capacitance between the first electrode and a second electrode at the first frequency, the first electrode being located at a first point on an exterior surface of a container that holds a liquid and the second electrode being located at a second point on the exterior surface of the container;
   measuring, by the processing device, a third current indicative of a self-capacitance of the first electrode at a second frequency, a fourth current indicative of a mutual-capacitance between the first electrode and the second electrode at the second frequency;
   determining, by the processing device, a fifth current through ambient ground at the first frequency using the first current and the second current and a sixth current through ambient ground at the second frequency using the third current and the fourth current, ambient ground is caused by coupling to surrounding objects;
   determining, by the processing device, a first set of impedances at the first frequency using the first, second, and fifth currents and a second set of impedances at the second frequency using the third, fourth, and sixth currents, the first set of impedances corresponding to a total impedance of the container and the liquid and the second set of impedances corresponding to an impedance of the container;
   determining, by the processing device, a third set of impedances by subtracting the second set of impedances from the first set of impedances, the third set of impedances corresponding to an impedance of the liquid held in the container; and
   determining, by the processing device, an electrical property of the liquid using the third set of impedances corresponding to the impedance of the liquid.

10. The method of claim 9, wherein the first frequency is higher than the second frequency, and the second frequency corresponds to a frequency at which the liquid behaves as a conductor as compared to a type of material used for the container.

11. The method of claim 9, wherein the first electrode is part of a first set of electrodes and the second electrode is part of a second set of electrodes, the first set and the second set of electrodes being arranged in a manner that corresponds to different levels of liquid in the container, wherein the method further comprises determining a current level of the liquid in the container using the first set of electrode and the second set of electrodes.

12. The method of claim 9, wherein:
   determining the first set of impedances comprises solving a first system of equations using the first, second, and fifth currents and at least two circuit models each having a T-like equivalent circuit, the T-like equivalent circuit having a first impedance at the first electrode, a second impedance at the second electrode, and a third impedance at ambient ground; and
   determining the second set of impedances comprises solving a second system of equations using the third, fourth, and sixth currents and the at least two circuit models.

13. The method of claim 9, wherein determining the electrical property comprises determining at least one of a permittivity of the liquid or a conductivity of the liquid using the third set of impedances and a set of geometrical parameters of the container.

14. A processing device comprising:
   a multi-port network configured to couple to a first electrode and a second electrode, the first electrode being located on an exterior surface of a container that holds a liquid and the second electrode being located on the exterior surface of the container;
a capacitance measurement circuit coupled to the multi-port network, wherein the capacitance measurement circuit is configured to:
   measure a first set of currents associated with the first electrode, the second electrode, and ambient ground at a first frequency; and
   measure a second set of currents associated with the first electrode, the second electrode, and ambient ground at a second frequency that is lower than the first frequency; and
a digital processing circuit coupled to the capacitance measurement circuit, wherein the digital processing circuit is configured to:
   determine independent impedances of the container, the liquid, and the liquid and container using the first set of currents and the second set of currents; and
   determine an electrical property of the liquid using the independent impedances of the liquid.

15. The processing device of claim 14, wherein:
the capacitance measurement circuit is further configured to:
   measure a first current indicative of a self-capacitance of the first electrode; and
   measure a second current indicative of a mutual-capacitance between the first electrode and the second electrode; and
the digital processing circuit is further configured to determine a third current through ambient ground at the first frequency using the first current and the second current.

16. The processing device of claim 15, wherein:
the capacitance measurement circuit is further configured to:
   measure a fourth current indicative of a self-capacitance of the first electrode; and
   measure a fifth current indicative of a mutual-capacitance between the first electrode and the second electrode; and
the digital processing circuit is further configured to determine a sixth current through ambient ground at the second frequency using the fourth current and the fifth current.

17. The processing device of claim 14, wherein:
the capacitance measurement circuit is further configured to:
   measure a first current indicative of a self-capacitance of the first electrode; and
   measure a second current indicative of a self-capacitance of the second electrode; and
the digital processing circuit is further configured to determine a third current through ambient ground at the first frequency using the first current and the second current.

18. The processing device of claim 14, wherein, to determine the independent impedances of the container, the liquid, and the liquid and container, the digital processing circuit is further configured to:
   determine a total impedance of the container and liquid using a first current, a second current, and a third current through ambient ground at the first frequency, the first current being indicative of a self-capacitance of the first electrode, the first electrode being located at a first point on an exterior surface of the container, the second current being indicative of a mutual-capacitance between the first electrode and a second electrode, the second electrode being located at a second point on the exterior surface of the container;
   determine an impedance of the container using a fourth current, a fifth current, and a sixth current through ambient ground at the second frequency, the fourth current being indicative of a self-capacitance of the first electrode, the fifth current being indicative of a mutual-capacitance between the first electrode and the second electrode; and
   determine an impedance of the liquid using the total impedance of the container and the liquid and the impedance of the container.

19. The processing device of claim 14, wherein the capacitance measurement circuit comprises a signal generator configured to generate an excitation signal, the excitation signal comprising a sine wave.

20. The processing device of claim 19, wherein the multi-port network comprises:
   a first multiplexer coupled to the first electrode, the capacitance measurement circuit, the signal generator, and the ambient ground; and
   a second multiplexer coupled to the second electrode, the capacitance measurement circuit, the signal generator, and the ambient ground.

21. The processing device of claim 19, wherein the capacitance measurement circuit comprises:
   a first receiver channel coupled to the first electrode;
   a second receiver channel coupled to the second electrode; and
   a second signal generator.

* * * * *